United States Patent
Don et al.

(10) Patent No.: US 12,277,222 B2
(45) Date of Patent: Apr. 15, 2025

(54) USING SNAPSHOTS FOR ANOMALY DETECTION

(71) Applicant: DELL PRODUCTS L.P., Hopkinton, MA (US)

(72) Inventors: Arieh Don, Newton, MA (US); Michael Ferrari, Douglas, MA (US); Benjamin Randolph, Uxbridge, MA (US)

(73) Assignee: DELL PRODUCTS L.P., Hopkinton, MA (US)

( * ) Notice: Subject to any disclaimer, the term of this patent is extended or adjusted under 35 U.S.C. 154(b) by 219 days.

(21) Appl. No.: 17/956,085

(22) Filed: Sep. 29, 2022

(65) Prior Publication Data
US 2024/0111863 A1 Apr. 4, 2024

(51) Int. Cl.
*G06F 21/56* (2013.01)

(52) U.S. Cl.
CPC ...... *G06F 21/565* (2013.01); *G06F 2221/034* (2013.01)

(58) Field of Classification Search
CPC ... G06F 21/565; G06F 2221/034; G06F 21/56
See application file for complete search history.

(56) References Cited

U.S. PATENT DOCUMENTS

| | | | | |
|---|---|---|---|---|
| 10,650,146 | B1* | 5/2020 | Gaurav | G06F 21/562 |
| 2019/0130097 | A1* | 5/2019 | Berler | G06F 21/552 |
| 2020/0319979 | A1* | 10/2020 | Kulaga | G06F 11/3006 |
| 2021/0136116 | A1* | 5/2021 | Ippatapu | H04L 63/061 |
| 2023/0342078 | A1* | 10/2023 | Thomas | G06F 3/0659 |
| 2023/0351015 | A1* | 11/2023 | Algieri | G06F 21/561 |

FOREIGN PATENT DOCUMENTS

EP    3591552 B1 *  3/2022  ......... G06F 21/316

* cited by examiner

*Primary Examiner* — Ryan J Jakovac
(74) *Attorney, Agent, or Firm* — Anderson Gorecki LLP

(57) ABSTRACT

A profile of characteristics of a normal snapshot of a storage object is computed from previous snapshots of the storage object. Characteristics of a new snapshot are compared with the characteristics in the profile to identify an anomaly indicative of a malicious attack. The characteristics include percent data changed between consecutive snapshots, write LBA dispersion, write data reducibility, number and size of writes, write workload profile, and write content profile. The new snapshot is only vaulted or air-gapped if all its characteristics are within ranges defined by the profile.

17 Claims, 3 Drawing Sheets

USING SNAPSHOTS FOR ANOMALY DETECTION

TECHNICAL FIELD

The subject matter of this disclosure is generally related to threat detection for data storage systems.

BACKGROUND

Network-attached storage (NAS), Storage Area Networks (SANs), and other types of storage systems are often used to maintain logical storage objects for storing host application data used by instances of host applications running on host servers. Examples of host applications may include, but are not limited to, multi-user software for email, accounting, inventory control, manufacturing, engineering, and a wide variety of other institutional functions. An individual storage array may simultaneously support multiple host applications. Separate groups of storage objects may be created for each host application. Each host application-specific storage object may be accessed by multiple instances of the associated host application using input-output commands (IOs). The storage objects, which are abstractions of space on physical storage drives, include contiguous ranges of logical block addresses (LBAs) at which blocks of host application data can be stored.

Storage systems may be subjected to a variety of malicious attacks. Some malicious attacks simply overwrite data. Other types of malicious attacks are designed to steal data. Still other types of malicious attacks, commonly known as ransomware attacks, encrypt data to support demands for payment of a ransom in exchange for the decryption keys. Storage systems are usually configured to replicate data to help avoid data loss and facilitate recovery from malicious attacks. Snapshots, for example, are incremental backups of storage objects that can enable recovery from some types of malicious attacks by restoring storage object state to a pre-attack point in time. However, delays in detection of a malicious attack may necessitate restoration of the storage object to a significantly earlier point in time, which can be disruptive. Foreground monitoring of IOs can be performed to help provide early detection of activity associated with a malicious attack. However, foreground monitoring of IOs can degrade performance and is limited to analysis at IO-level granularity.

SUMMARY

In accordance with some implementations a method comprises: identifying a storage object; computing a profile of characteristics of a normal snapshot of the storage object; creating a new snapshot of the storage object; identifying characteristics of the new snapshot; and comparing the characteristics of the new snapshot with the characteristic of the profile to identify an anomaly indicative of a malicious attack.

In accordance with some implementations an apparatus comprises: non-volatile drives with storage space mapped to a storage object; and at least one compute node configured to: compute a profile of characteristics of a normal snapshot of the storage object; obtain a new snapshot of the storage object; identify characteristics of the new snapshot; and compare the characteristics of the new snapshot with the characteristic of the profile to identify an anomaly indicative of a malicious attack.

In accordance with some implementations a non-transitory computer-readable storage medium stores instructions that when executed by a computer cause the computer to perform a method comprising: identifying a storage object; computing a profile of characteristics of a normal snapshot of the storage object; creating a new snapshot of the storage object; identifying characteristics of the new snapshot; and comparing the characteristics of the new snapshot with the characteristic of the profile to identify an anomaly indicative of a malicious attack.

Other aspects, features, and implementations may become apparent in view of the detailed description and figures. All examples, aspects and features can be combined in any technically possible way.

DETAILED DESCRIPTION

Aspects of the inventive concepts are described as being implemented in a data storage system that includes a host server and a storage array that may be characterized as a SAN. Such implementations should not be viewed as limiting. Those of ordinary skill in the art will recognize that there are a wide variety of implementations of the inventive concepts in view of the teachings of the present disclosure. Some aspects, features, and implementations described herein may include machines such as computers, electronic components, optical components, and processes such as computer-implemented procedures and steps. It will be apparent to those of ordinary skill in the art that the computer-implemented procedures and steps may be stored as computer-executable instructions on a non-transitory computer-readable medium. Furthermore, it will be understood by those of ordinary skill in the art that the computer-executable instructions may be executed on a variety of tangible processor devices, i.e., physical hardware. For practical reasons, not every step, device, and component that may be part of a computer or data storage system is described herein. Those of ordinary skill in the art will recognize such steps, devices, and components in view of the teachings of the present disclosure and the knowledge generally available to those of ordinary skill in the art. The corresponding machines and processes are therefore enabled and within the scope of the disclosure.

The terminology used in this disclosure is intended to be interpreted broadly within the limits of subject matter eligibility. The terms "logical" and "virtual" are used to refer to features that are abstractions of other features, e.g., and without limitation abstractions of tangible features. The term "physical" is used to refer to tangible features that possibly include, but are not limited to, electronic hardware. For example, multiple virtual computers could operate simultaneously on one physical computer. The term "logic" is used to refer to special purpose physical circuit elements, firmware, software, computer instructions that are stored on a non-transitory computer-readable medium and implemented by multi-purpose tangible processors, and any combinations thereof.

Figure 1:
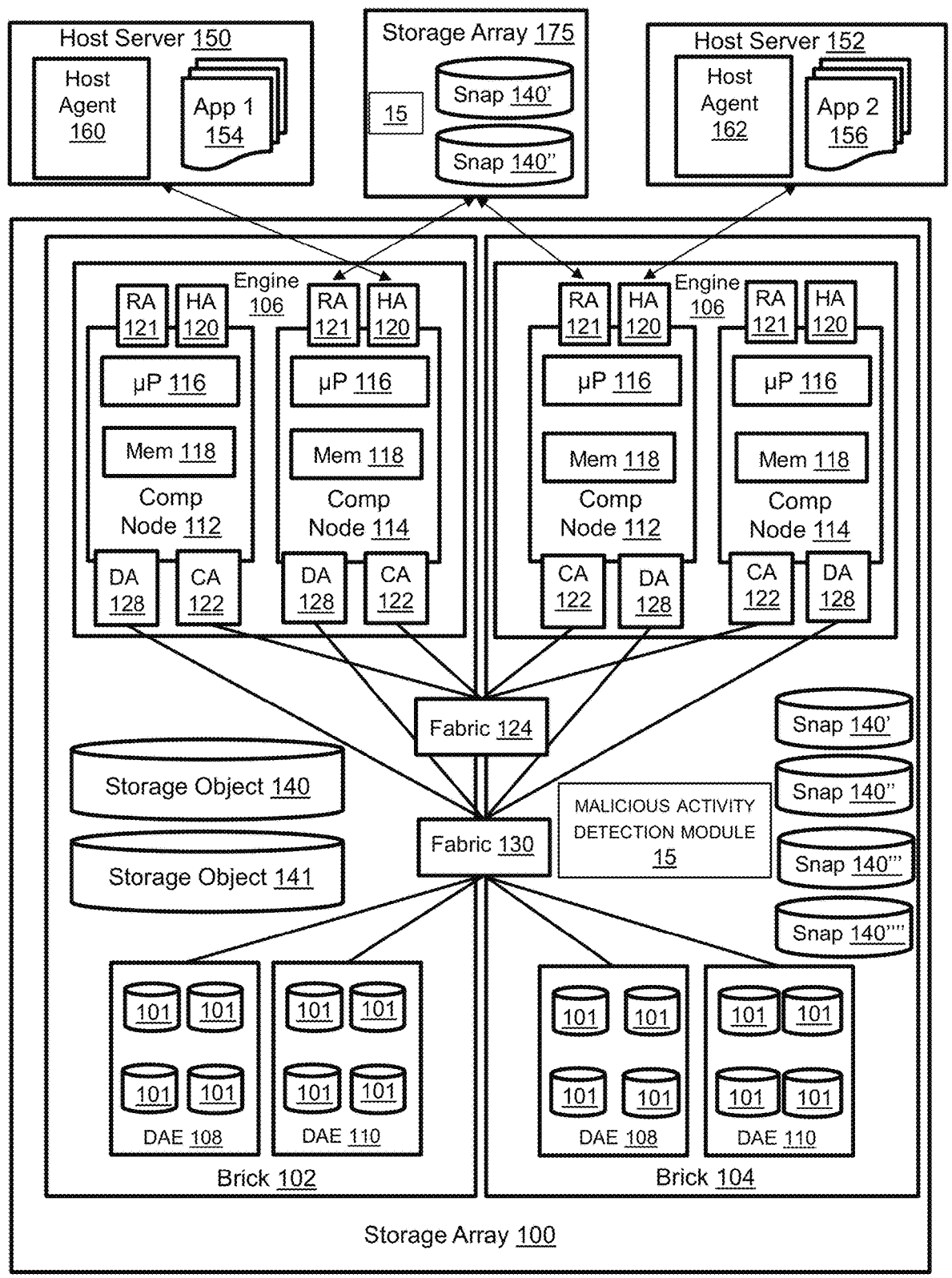
FIG. 1 illustrates a storage system with malicious activity detection modules for detecting potential malicious activity in the background by analyzing snapshots to identify anomalies.

FIG. 1 illustrates a storage system with malicious activity detection modules 15 for detecting potential malicious activity in the background by analyzing snapshots. The malicious activity detection modules 15 may be run on a production storage array 100, a remote node such as a non-production storage array 175, or both. As will be explained in greater detail below, the malicious activity detection modules 15 analyze prior snapshots that do not contain anomalies associated with a malicious activity to identify ranges of various characteristics associated with normal snapshots. A profile of a normal snapshot is defined by those ranges. A new snapshot is tested against those characteristics and flagged as including anomalies if the new snapshot fails to exhibit characteristics within the ranges of normal snapshots. Separate profiles are generated for each snapped storage object.

The storage array 100 includes one or more bricks 102, 104. Each brick includes an engine 106 and one or more drive array enclosures (DAEs) 108, 110. Each DAE includes managed drives 101 of one or more technology types. Examples may include, without limitation, solid-state drives (SSDs) such as flash and hard disk drives (HDDs) with spinning disk storage media. Each DAE might include many more managed drives than illustrated. Each engine 106 includes a pair of interconnected compute nodes 112, 114, which may be referred to as "storage directors." Each compute node includes hardware resources such as at least one multi-core processor 116 and local memory 118. The processor may include Central Processing Units (CPUs), Graphics Processing Units (GPUs), or both. The local memory 118 may include volatile Random-Access Memory (RAM) of any type, Non-Volatile Memory (NVM) such as Storage Class Memory (SCM), or both. Each compute node includes one or more host adapters (HAs) 120 for communicating with the host servers 150, 152. Each HA has hardware resources for servicing IOs, e.g., processors, volatile memory, and ports via which the hosts may access the SAN node. Each compute node also includes a remote adapter (RA) 121 for communicating with other nodes such as remote storage array 175. Each compute node also includes one or more drive adapters (DAs) 128 for communicating with the managed drives 101 in the DAEs 108, 110. Each drive adapter has hardware resources for servicing IOs, e.g., processors, volatile memory, and ports via which the computing node may access the DAEs. Each compute node may also include one or more channel adapters (CAs) 122 for communicating with other compute nodes via an interconnecting fabric 124. An operating system (OS) running on the SAN has resources for servicing IOs and supports a wide variety of other functions. Each compute node may allocate a portion or partition of its respective local memory 118 to a shared memory that can be accessed by other compute nodes, e.g., via Direct Memory Access (DMA) or Remote DMA (RDMA). The paired compute nodes 112, 114 of each engine 106 provide failover protection and may be directly interconnected by communication links. An interconnecting fabric 130 enables implementation of an N-way active-active backend. A backend connection group includes all DAs that can access the same drive or drives. In some implementations every DA 128 in the storage array can reach every DAE via the fabric 130. Further, in some implementations every DA in the SAN can access every managed drive 101 in the SAN. The malicious activity detection module 15 may be stored on a non-transitory media and run on one or more of the compute nodes.

Data used by instances of the host applications 154, 156 running on the host servers 150, 152 is maintained on the managed drives 101. The managed drives 101 are not discoverable by the host servers 150, 152 but the storage array 100 creates production storage objects 140, 141 that can be discovered and accessed by the host servers. The production storage objects are logical storage devices that may be referred to as production volumes, production devices, or production LUNs, where Logical Unit Number (LUN) is a number used to identify logical storage volumes in accordance with the Small Computer System Interface (SCSI) protocol. From the perspective of the host servers 150, 152, each production storage object 140, 141 is a single drive having a set of contiguous fixed-size logical block addresses (LBAs) on which data used by instances of a host application resides. However, the host application data is stored at non-contiguous addresses on various managed drives 101. The data used by instances of an individual host application may be maintained on one production storage object or a group of storage objects that can be accessed by all instances of that host application. In the illustrated example, storage object 140 is used exclusively by instances of host application 154 and storage object 141 is used exclusively by instances of host application 156. To service IOs from instances of a host application, the storage array 100 maintains metadata that indicates, among various things, mappings between LBAs of the production storage objects 140, 141 and addresses with which extents of host application data can be accessed from the shared memory and managed drives 101.

The storage array 100 implements data replication to avoid data loss and enable storage object state to be restored to an earlier point in time. Replication is accomplished by generating snapshots of storage objects. Snapshots, often referred to as snaps, are incremental copies that represent the changes made to the storage object since some prior point in time, which is usually since the creation of the most recent snap of the storage object. Snaps are smaller in size than complete copies, so snap generation is faster and requires less resources than generation of a complete copy, which is advantageous because it may be desirable to generate frequent snaps of a storage object. In the illustrated example, snapshots 140', 140'', 140''', and 140'''' are snapshots of storage object 140 in sequential chronological order with snapshot 140' being the oldest.

Standard snapshots are created by writing data to a snap volume. A new snap volume is created periodically, and "original" data that has changed since the most recent snapshot is written to the new snap volume as a target device. Each snap volume represents a single snapshot of a single prior point in time. Snap volumes can be mounted like other storage devices, which enables snapshots to be easily accessed by the host servers and host applications. However, creating snap volumes requires generation of volume metadata and use of memory, non-volatile storage space, and potentially network bandwidth because the original data must be written to the snap volume. "Targetless snapshots" do not require writing original data to a snap volume. Rather, targetless snapshots are created by generating metadata that references the original data in situ. For example, metadata such as pointers can be created in replication data structures such as tables to map to the original changed data on local drives. Because a single targetless snap can represent a prior state of a storage object with just a replication data structure and the referenced in situ data, targetless snapshots advantageously require fewer resources to create and maintain than standard volume-based snapshots. Either targeted or targetless snapshots can be utilized by the malicious activity detection module 15.

Figure 2:
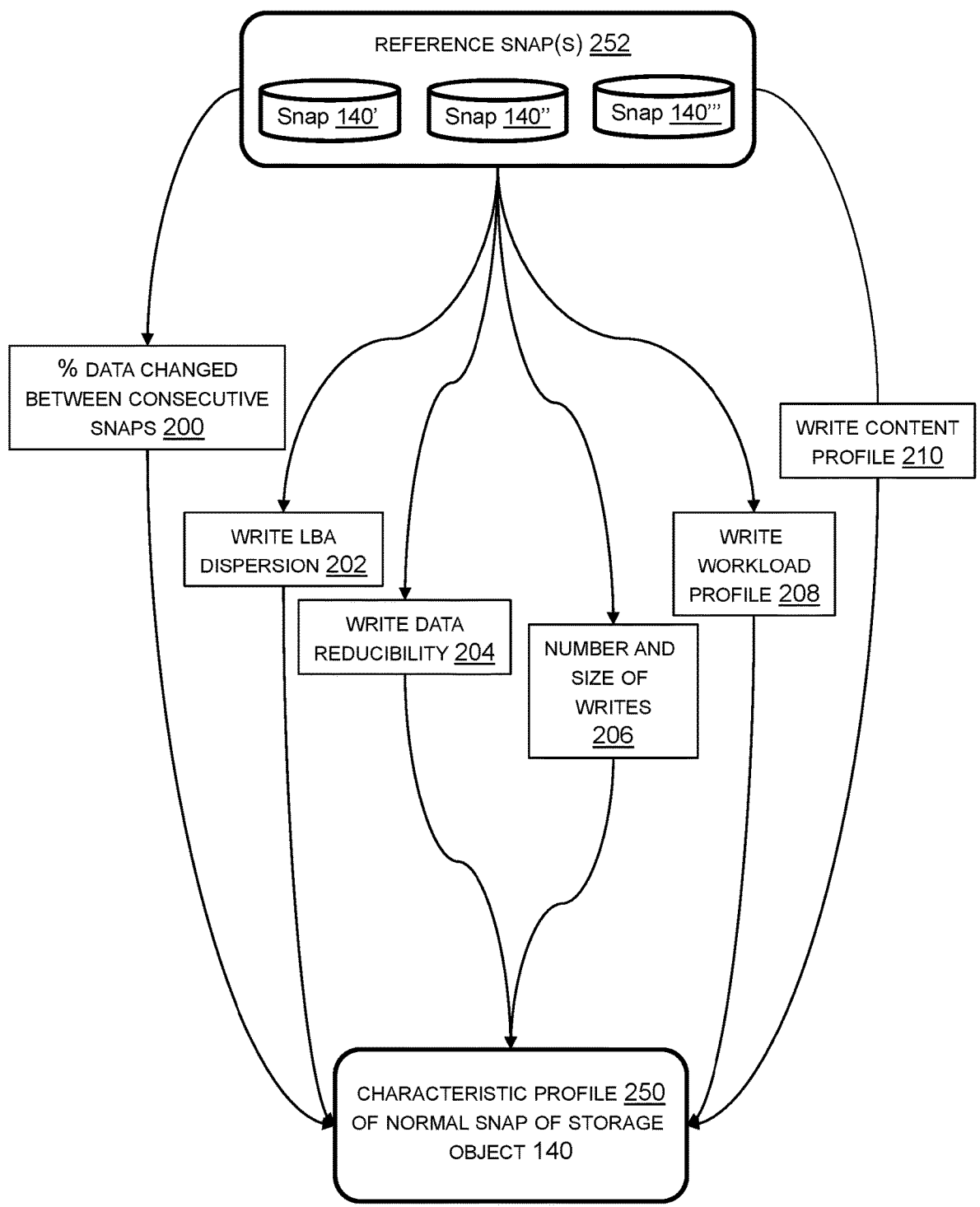
FIG. 2 illustrates generation of a characteristic profile of a normal snapshot.

FIG. 2 illustrates generation of a characteristic profile 250 of a normal snapshot of storage object 140 (FIG. 1). A set of one or more reference snaps 252 of storage object 140 is analyzed to identify characteristics that define a normal snapshot. In the illustrated example, the reference snaps are snap 104', snap 140", and snap 104'''. The analyzed characteristics include percent data changed between consecutive snaps 200, write LBA dispersion 202, write data reducibility 204, number and size of writes 206, write workload profile 208, and write content profile 210. The percent data changed may be represented as the amount of data written in a snap relative to the size of the storage object. An increase in percent data changed may be indicative of malicious activity such as overwriting or encrypting data. Write LBA dispersion indicates relative proximity of LBAs associated with writes. If writes are usually directed to consecutive LBAs and suddenly become non-consecutive, or vice versa, then a malware attack may be indicated. The LBAs written may also be considered because, for example, some applications normally write to the next sequential free LBA rather than overwriting LBAs that contain data. Write data reducibility is an indication of compressibility. Data that is normally compressible and suddenly becomes uncompressible may be an indication of a ransomware attack due to the relative incompressibility of encrypted data. The number and size of all writes may be represented in terms of storage capacity or fixed-size chunks. For example, some block-based storage systems may only have awareness of which chunks were written and thus a chunk count. However, chunk size is known and can be multiplied by the number of chunks written. Furthermore, counts of different size chunks can be bucketed. Changes in the frequency or sizes of writes may be indicative of a malicious attack. The write workload profile may be represented as a ratio of read IOs to write IOs (RD:WR). Malicious attacks may be associated with a sudden increase in either reads or writes, either of which tends to change the RD:WR. For example, an increase in reads could indicate an attempt to steal data, whereas an increase in writes could indicate an attempt to overwrite data. The write content profile can be represented as data patterns or randomness. For example, the sudden appearance of data written as all logic 0s or 1s, or repeated patterns, may be indicative of a malicious attack. The reference snaps 252 are analyzed to calculate a normal range for each of the characteristics, e.g., ranges defined by min and max values of the reference snaps in set. The ranges define the characteristic profile 250 of a normal snapshot of storage object 140. The ranges may be defined separately for different times of day, days of the week, and any of a variety of other variables over which the characteristics may exhibit predictable patterns of variation. Separate profiles are created for each snapped storage object.

Figure 3:
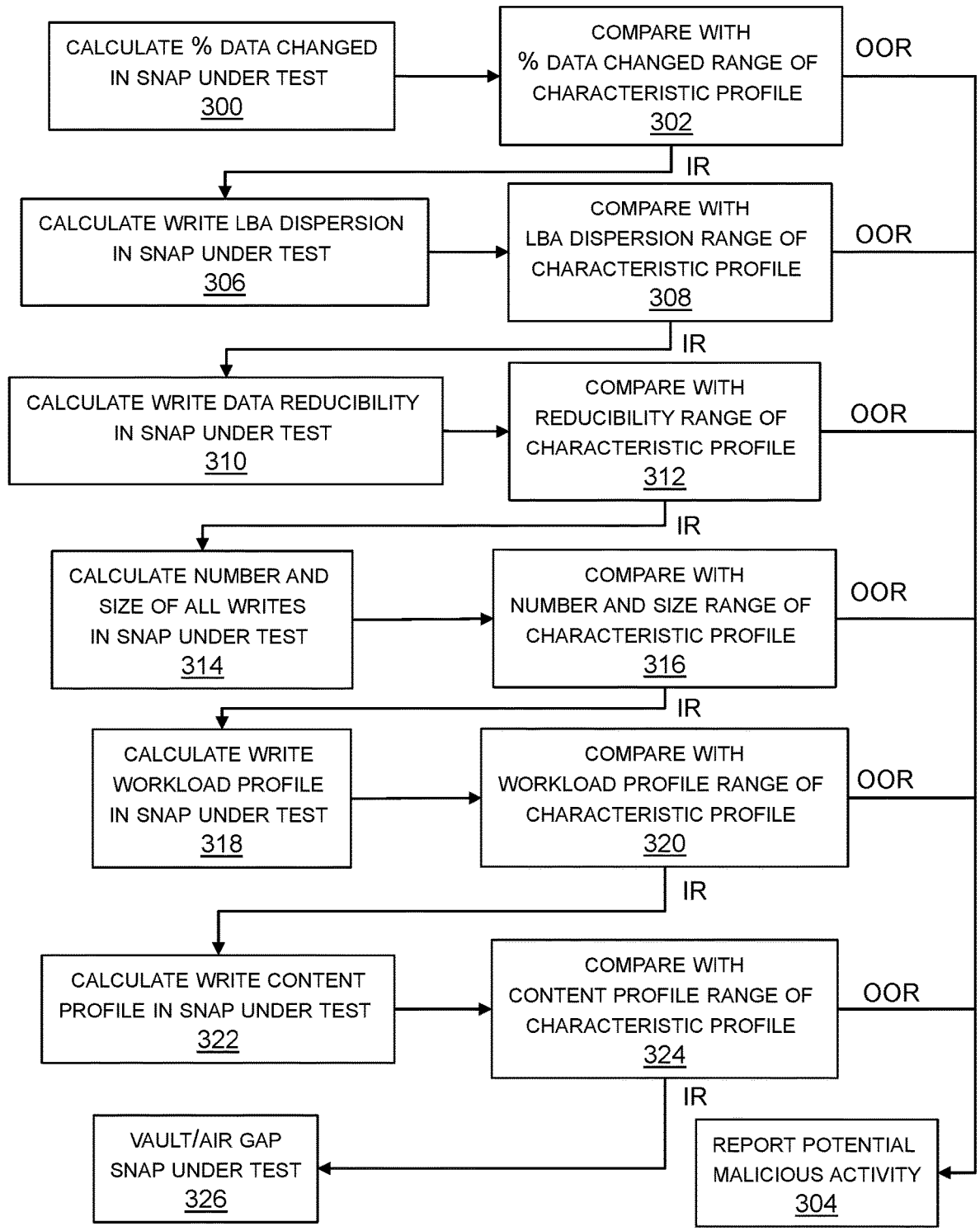
FIG. 3 illustrates a process for testing a new snapshot for potential malicious activity.

Referring to FIGS. 1 and 3, when a new snap 140'''' is created, it becomes a snap under test before being vaulted or air-gapped. In step 300 the malicious activity detection module analyzes the snap under test to identify the percent data changed. Step 302 is comparing percent data changed between consecutive snaps, which in this instance is between snap 140'''' and the next most recent snap 140'''. If the percent data changed of the snap under test is out of range (OOR) relative to the range of normal snapshot of storage object 140 as defined by the characteristic profile, then potential malicious activity is reported in step 304. If the percent data changed of the snap under test is in range (IR) as defined by the characteristic profile, then step 306 is calculating the write LBA dispersion of the snap under test. Step 308 is comparing the write LBA dispersion of the snap under test with the write LBA dispersion range of the characteristic profile. If the write LBA dispersion of the snap under test is OOR relative to the write LBA dispersion range of the characteristic profile, then potential malicious activity is reported in step 304. If the write LBA dispersion of the snap under test is IR relative to the write LBA dispersion range of the characteristic profile, then step 310 is calculating the write data reducibility of the snap under test. Step 312 is comparing the write data reducibility of the snap under test with the write data reducibility range of the characteristic profile. If the write data reducibility of the snap under test is OOR relative to the write data reducibility range of the characteristic profile, then potential malicious activity is reported in step 304. If the write data reducibility of the snap under test is IR relative to the write data reducibility range of the characteristic profile, then step 314 is calculating the number and size of all writes of the snap under test. Step 316 is comparing the number and size of all writes of the snap under test with the number and size of all writes range of the characteristic profile. If the number and size of all writes of the snap under test is OOR relative to the number and size of all writes range of the characteristic profile, then potential malicious activity is reported in step 304. If the number and size of all writes of the snap under test is IR relative to the number and size of all writes range of the characteristic profile, then step 318 is calculating the write workload profile of the snap under test. Step 320 is comparing the write workload profile of the snap under test with the write workload profile range of the characteristic profile. If the write workload profile of the snap under test is OOR relative to the write workload profile range of the characteristic profile, then potential malicious activity is reported in step 304. If the write workload profile of the snap under test is IR relative to the write workload profile range of the characteristic profile, then step 322 is calculating the write content profile of the snap under test. Step 324 is comparing the write content profile of the snap under test with the write content profile range of the characteristic profile. If the write content profile of the snap under test is OOR relative to the write content profile range of the characteristic profile, then potential malicious activity is reported in step 304. If the write content profile of the snap under test is IR relative to the write content profile range of the characteristic profile, then the snap under test is vaulted or air gapped in step 326.

An advantage of at least some implementations of the concepts described above is that anomaly detection is performed in the background. For example, anomaly detection may be performed by the production storage array with spare cpu cycles or offloaded to a remote storage array. Consequently, processing of foreground IOs is not hindered and performance does not suffer. Further, anomaly detection is performed at the snapshot level of granularity as opposed to the IO level of granularity, which may yield more accurate anomaly detection.

Specific examples have been presented to provide context and convey inventive concepts. The specific examples are not to be considered as limiting. A wide variety of modifications may be made without departing from the scope of the inventive concepts described herein. Moreover, the features, aspects, and implementations described herein may be combined in any technically possible way. Accordingly, modifications and combinations are within the scope of the following claims.

What is claimed is:

1. A method comprising:
identifying a storage object that is a logical disk drive having a set of contiguous fixed-size logical block addresses (LBAs) and on which data associated with only a single host application is logically stored by a block-based storage system that lacks metadata that identifies files within the data;
prior to a malicious attack, computing a profile of characteristics of normal snapshots of the storage object from a plurality of snapshots of the storage object, the characteristics comprising write LBA dispersion indicative of distances between different writes in terms of counts of unwritten LBAs between written LBAs, write workload indicative of read:write input/output (IO) command ratio, number of write IO commands received, and size of associated write operations in terms of storage capacity or fixed-size chunks;
creating a new snapshot of the storage object after the malicious attack has commenced and before the malicious attack has been detected;
identifying characteristics of the new snapshot; and
detecting the malicious attack by comparing the characteristics of the new snapshot with the characteristics of the profile to identify an anomalistic change indicative of the malicious attack.

2. The method of claim 1 further comprising comparing percent data changed between consecutive snapshots including the new snapshot with a range of percent data changed between consecutive snapshots indicated by the profile.

3. The method of claim 2 further comprising comparing write LBA dispersion of the new snapshot with a write LBA dispersion range indicated by the profile.

4. The method of claim 3 further comprising comparing write data reducibility of the new snapshot with a write data reducibility range indicated by the profile.

5. The method of claim 4 further comprising comparing number and size of writes of the new snapshot with a number and size of writes range indicated by the profile.

6. The method of claim 5 further comprising comparing write workload of the new snapshot with a write workload range indicated by the profile.

7. The method of claim 6 further comprising comparing write content of the new snapshot with a write content range indicated by the profile.

8. An apparatus comprising:
non-volatile drives with storage space mapped to a storage object that is a logical disk drive having a set of contiguous fixed-size logical block addresses (LBAs) and on which data associated with only a single host application is logically stored by a block-based storage system that lacks metadata that identifies files within the data; and
at least one compute node configured to:
prior to a malicious attack, compute a profile of characteristics of normal snapshots of the storage object from a plurality of snapshots of the storage object, the characteristics comprising write LBA dispersion indicative of distances between different writes in terms of counts of unwritten LBAs between written LBAs, write workload indicative of read:write input/output (IO) command ratio, number of write IO commands received, and size of associated write operations in terms of storage capacity or fixed-size chunks;
obtain a new snapshot of the storage object after the malicious attack has commenced and before the malicious attack has been detected;
identify characteristics of the new snapshot; and
detect the malicious attack by comparing the characteristics of the new snapshot with the characteristics of the profile to identify an anomalistic change indicative of the malicious attack.

9. The apparatus of claim 8 further comprising the at least one compute node configured to compare percent data changed between consecutive snapshots including the new snapshot with a range of percent data changed between consecutive snapshots indicated by the profile.

10. The apparatus of claim 9 further comprising the at least one compute node configured to compare write LBA dispersion of the new snapshot with a write LBA dispersion range indicated by the profile.

11. The apparatus of claim 10 further comprising the at least one compute node configured to compare write data reducibility of the new snapshot with a write data reducibility range indicated by the profile.

12. The apparatus of claim 11 further comprising the at least one compute node configured to compare number and size of writes of the new snapshot with a number and size of writes range indicated by the profile.

13. The apparatus of claim 12 further comprising the at least one compute node configured to compare write workload of the new snapshot with a write workload range indicated by the profile.

14. The apparatus of claim 13 further comprising the at least one compute node configured to compare write content of the new snapshot with a write content range indicated by the profile.

15. A non-transitory computer-readable storage medium storing instructions that when executed by a computer cause the computer to perform a method comprising:
identifying a storage object that is a logical disk drive having a set of contiguous fixed-size logical block addresses (LBAs) and on which data associated with only a single host application is logically stored by a block-based storage system that lacks metadata that identifies files within the data;
prior to a malicious attack, computing a profile of characteristics of normal snapshots of the storage object from a plurality of snapshots of the storage object, the characteristics comprising write LBA dispersion indicative of distances between different writes in terms of counts of unwritten LBAs between written LBAs, write workload indicative of read:write input/output (IO) command ratio, number of write IO commands received, and size of associated write operations in terms of storage capacity or fixed-size chunks;
creating a new snapshot of the storage object after the malicious attack has commenced and before the malicious attack has been detected;
identifying characteristics of the new snapshot; and
detecting the malicious attack by comparing the characteristics of the new snapshot with the characteristics of the profile to identify an anomalistic change indicative of the malicious attack.

16. The non-transitory computer-readable storage medium of claim 15 in which the method further comprises comparing percent data changed between consecutive snapshots including the new snapshot with a range of percent data changed between consecutive snapshots indicated by the profile.

17. The non-transitory computer-readable storage medium of claim 16 in which the method further comprises comparing write LBA dispersion of the new snapshot with a write LBA dispersion range indicated by the profile.

* * * * *